US009426254B2

(12) United States Patent
Pohlmann et al.

(10) Patent No.: US 9,426,254 B2
(45) Date of Patent: Aug. 23, 2016

(54) METHODS AND SYSTEMS FOR BUILDING A SOFTWARE APPLIANCE

(71) Applicant: SAP SE, Walldorf (DE)

(72) Inventors: Michael Pohlmann, Heidelberg (DE); Richard Bothe, Oberding (DE)

(73) Assignee: SAP SE, Walldorf (DE)

( * ) Notice: Subject to any disclaimer, the term of this patent is extended or adjusted under 35 U.S.C. 154(b) by 427 days.

(21) Appl. No.: 14/087,861

(22) Filed: Nov. 22, 2013

(65) Prior Publication Data

US 2015/0149993 A1 May 28, 2015

(51) Int. Cl.
G06F 9/445 (2006.01)
H04L 29/08 (2006.01)
G06F 9/455 (2006.01)

(52) U.S. Cl.
CPC ............ *H04L 67/34* (2013.01); *G06F 8/63* (2013.01); *G06F 9/45545* (2013.01)

(58) Field of Classification Search
CPC .. G06F 9/4451; G06F 9/4856; G06F 9/5088; G06F 17/30067; G06F 3/0604; G06F 8/61; G06Q 30/0601; H04L 67/10; H04L 67/34
See application file for complete search history.

(56) References Cited

U.S. PATENT DOCUMENTS

| 5,838,918 A | 11/1998 | Prager et al. |
| 5,913,218 A | 6/1999 | Carney et al. |
| 6,266,666 B1 | 7/2001 | Ireland et al. |
| 6,633,923 B1 | 10/2003 | Kukura et al. |
| 7,921,023 B2 | 4/2011 | Theiss et al. |
| 8,166,341 B2 | 4/2012 | DeHaan et al. |
| 8,255,350 B2 | 8/2012 | Lindenlaub et al. |
| 8,433,684 B2 | 4/2013 | Munoz |
| 8,463,885 B2 | 6/2013 | DeHaan |
| 2006/0288168 A1* | 12/2006 | Stevenson ............. G06F 9/4451 711/115 |
| 2008/0016186 A1 | 1/2008 | Ball |
| 2008/0244047 A1 | 10/2008 | Yeung et al. |
| 2009/0276771 A1* | 11/2009 | Nickolov ............. G06F 9/4856 717/177 |
| 2010/0017812 A1 | 1/2010 | Nigam |
| 2010/0031232 A1 | 2/2010 | Glazier et al. |
| 2010/0180272 A1* | 7/2010 | Kettler ............... G06Q 30/0601 717/171 |
| 2012/0131567 A1* | 5/2012 | Barros .................. G06F 9/5088 717/170 |
| 2012/0265959 A1* | 10/2012 | Le ..................... G06F 17/30067 711/162 |
| 2013/0067461 A1 | 3/2013 | Taragin et al. |
| 2013/0246589 A1 | 9/2013 | Klemba et al. |
| 2013/0282994 A1* | 10/2013 | Wires .................... G06F 3/0604 711/158 |

* cited by examiner

Primary Examiner — Tuan Vu
(74) Attorney, Agent, or Firm — Jones Day

(57) ABSTRACT

A computer implemented method may include installing a software appliance on a first computer system, the software appliance including database software and a business application. The software appliance may be configured on the first computer system to a predetermined configuration of the business application and the database software. The configured software appliance may be detached from an operating system of the first computing device. The detaching of the software appliance may include collecting metadata associated with the software appliance, the operating system and hardware the first system. The detached software appliance and the metadata may be stored on computer readable medium.

16 Claims, 7 Drawing Sheets

200

300

400

500

METHODS AND SYSTEMS FOR BUILDING A SOFTWARE APPLIANCE

RELATED APPLICATIONS

This application is related to U.S. patent application Ser. No. 14/069,969, "BUILDING AND TRANSPORTING CENTRALLY MODIFIED SOFTWARE SYSTEMS," filed on Nov. 1, 2013, and to U.S. patent application Ser. No. 13/631,526, "SOFTWARE APPLIANCE INSTALLATION SYSTEMS AND METHODS," filed on Sep. 28, 2012, the entirety of which are incorporated by reference herein.

BACKGROUND

Software appliance is a software application designed for installation in industry standard hardware. The standard hardware may include a server or a virtual machine. The software appliance may be packaged with the standard hardware to provide a hardware appliance. The hardware appliance may be designed and configured to perform specific functions. The software appliance may include restrictions to be used only with supplier approved hardware.

Customers may request the hardware appliance from a supplier for specific applications. The supplier may install and configure the software appliance in the hardware based on the customer's requested specifications. When customers want to make changes to the hardware appliance, the customer needs to request a new hardware appliance from the supplier. The customers may also return the old hardware appliance to the supplier to be reconfigured with a new software appliance or request the supplier to reconfigure the hardware appliance at the customer's location. However, all of these methods are time consuming and costly. In addition, existing methods for installing and configuring the software appliance on the hardware provide little flexibility for re-deployment of existing hardware.

BRIEF DESCRIPTION OF THE DRAWINGS

The accompanying drawings illustrate the various embodiments and, together with the description, further serve to explain the principles of the embodiments and to enable one skilled in the pertinent art to make and use the embodiments.

SUMMARY

Embodiments of the present disclosure provide for methods and systems to create a software appliance that can be installed on a system of a client. The client's system may include in-memory hardware that will be used by the software appliance. The software appliance may include in-memory database software and a business application using the in-memory database software.

According to one embodiment, a computer implemented method may include installing a software appliance on a first computer system, the software appliance including database software and a business application. The software appliance may be configured on the first computer system to a predetermined configuration of the business application and the database software. The configured software appliance may be detached from an operating system of the first computing device. The detaching of the software appliance may include collecting metadata associated with the software appliance, the operating system and hardware the first system. The detached software appliance and the metadata may be stored on computer readable medium.

The detached software appliance may be installed on a second computer system. The second computer system may include hardware and an operating system that is similar to the first computer system. The detached software appliance may be attached to the operating system of the second computer system while preserving the configurations to the software appliance that were made on the first computer system.

DETAILED DESCRIPTION

Figure 1:
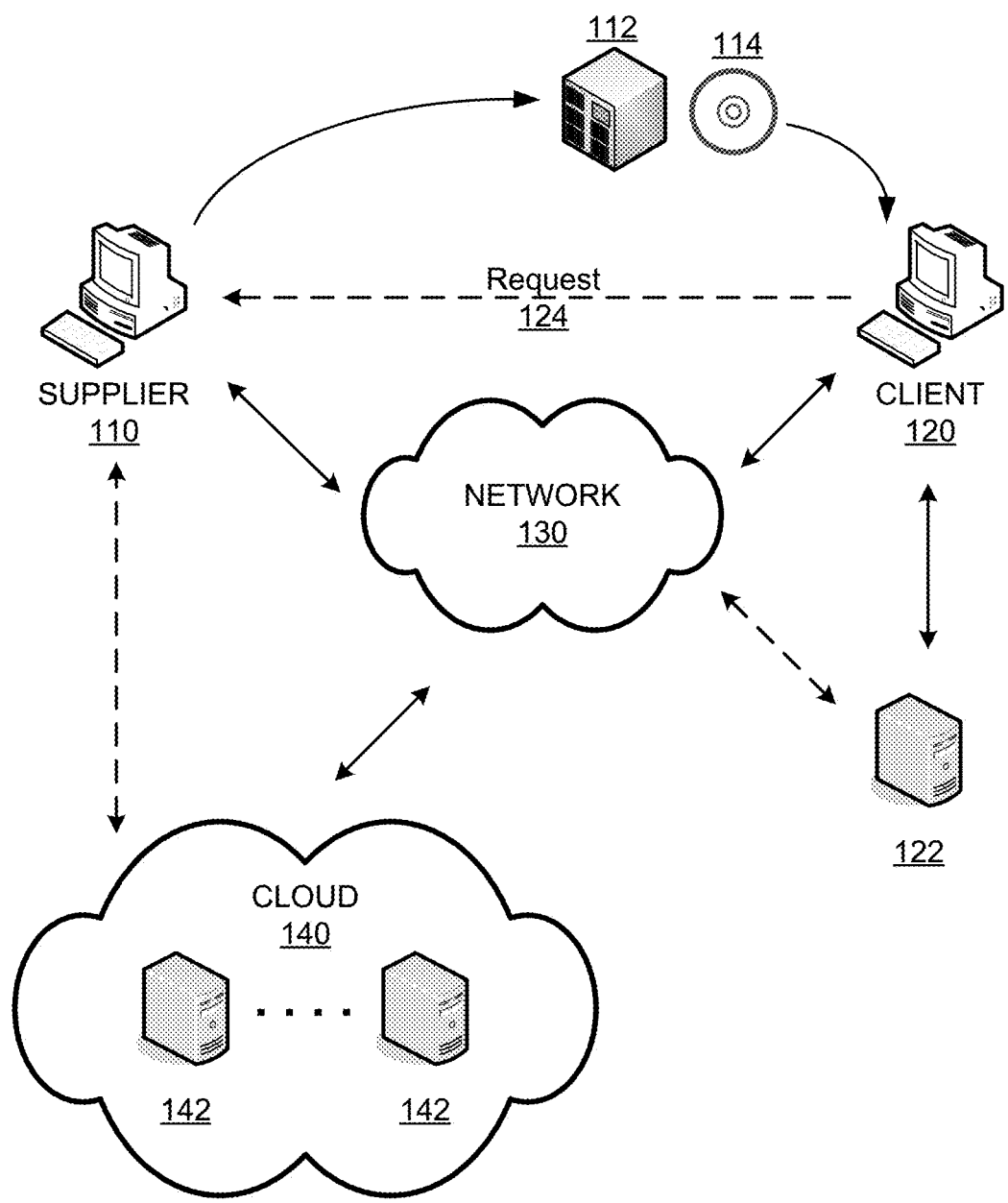
FIG. 1 is a block diagram illustrating an example embodiment of a system for providing a software appliance to a client according to embodiments of the present disclosure.

FIG. 1 is a block diagram illustrating an example embodiment of a system 100 for providing a software appliance to a client 120 according to embodiments of the present disclosure. A client 120 may request 124 a software appliance from a supplier 110. The request 124 may include a type of application that the software appliance will be used for and/or the specifications of a hardware appliance (e.g., client's existing hardware appliance) that will run the software appliance. The application of the hardware appliance may be a complex application which depends on particular operating, server, and/or database resources for operating. In response to the request 124, the supplier 110 may provide the software appliance to the client 120.

The supplier 110 may provide the software appliance as part of a new hardware appliance 112 that is shipped to the client 120. The software appliance may be installed and configured on the hardware appliance 112 by the supplier 110. The client 120 may also ship the existing hardware appliance 122 to the supplier 110 to install and configure the software appliance on the existing hardware appliance 122. However, because the applications may depend on particular operating, server, and/or database resources for operation, a new installation and configuration can be costly and time consuming.

To reduce cost and time to install and configure the software appliance, the supplier 110 may provide the client 120 with a software appliance that is detached from the hardware. The detached software appliance may be provided on computer-readable media 114 (e.g., CDROM or Blue-ray Disk) or sent over a network 130. Before sending the software appliance, the software appliance may be installed and configured by the supplier 110 on its own hardware, detached from the hardware and packaged for shipment. After the client 120 receives the software appliance, the client 120 may deploy the received software appliance on existing hardware appliance 122 and/or on a cloud computing system 140. In one embodiment, the supplier 110 may deploy the software appliance on the cloud computing system 140 (e.g., over the network 130).

The cloud computing system 140 may include one or more servers 142. Similarly, the hardware appliance 122 may include one or more servers. The servers 122 and 142 may be physical or virtual computing resources. The servers 122 and 142 may include the information necessary to run the application software, and may include an operating system, such as Windows®, Linux®, or UNIX®.

In some embodiments, the cloud computing system 140 may be implemented in an internal corporate network or the public Internet, accessible via network 130. The cloud 140 can be a public cloud (e.g., Amazon Web Services®), a private cloud, a community cloud, or a hybrid cloud. In a public cloud, a service provider (e.g., supplier 110) can make its applications, storage, and other resources available to the general public or subscribers over the Internet. A private cloud can be a cloud infrastructure operated solely for a single organization, whether managed internally or by a third-party and hosted internally or externally. A community cloud may share the infrastructure between several organizations from a specific community with common concerns (security, compliance, jurisdiction, etc.), whether managed internally or by a third-party and hosted internally or externally. A hybrid cloud can be a composition of two or more clouds (private, community or public) that remain unique entities but are bound together, offering the benefits of multiple deployment models.

The supplier 110, which may be a computing device, may communicate with servers 122 and 142, and/or the client 120 directly or via the network 130. The supplier 110 may include at least a processor or processing circuit and memory. The supplier 110 may be a server, workstation computers, laptop, desktop, smart phone, tablet, or any other computing device upon which a software appliance may be installed. The supplier 110 may execute software applications (e.g., virtual desktop software, file transfer software, a detachment utility, etc.) stored in memory of the computing device. The software applications may generally facilitate the methods described herein and may facilitate sending and receiving data to and from other computing devices (e.g., servers 122 and 142, client device 120, and other physical machines or virtual servers in a cloud computer system) over network 130.

The client device 120, which may be a computing device, may communicate with servers 122 and 142, and supplier 110 directly or via the network 130. The client 120 may include at least a processor or processing circuit and memory. The client 120 may be a server, workstation computers, laptop, desktop, smart phone, tablet, or any other computing device. The client device 120 may communicate with the servers 122 and 142 to execute and/or control the operation of the software appliance installed on these systems.

The network 130 can be or can include computer networks such as the Internet, local area network (LAN), wide area network (WAN), metro or other area networks, cellular networks, intranets, satellite networks, or other computer networks. The network 130 may also include any number of hardwired and/or wireless connections. For instance, the supplier 110 and/or the client 120 may communicate wirelessly (e.g., via WiFi, cellular, radio, etc.) with a transceiver that is hardwired (e.g., via a fiber optic cable, a CAT5 cable, etc.) to other computing devices in network 130. The network 130 may further include any number of computing devices, for example servers, computers, routers, databases, and network switches, that are configured to receive and/or transmit data within network 130.

In one embodiment, software appliances can be generated using a computing device or a server (e.g., via Virtual Appliance Factory software offered by SAP AG). For example, the supplier device 110 may package a software stack (e.g., a software application and a system) and any of its required dependencies (e.g., an underlying database) into a software appliance in the form of an image. The software appliance can run on various operating systems, such as Windows®, Linux®, or UNIX® operating systems. To deliver and install the software appliance to another machine (e.g., server 122 or 142) the software appliance can be detached from the operating system before the delivery.

In one embodiment, the supplier 110, server 122 and/or servers 142 may be in-memory hardware designed to handle one or more of columnar data storage, massively parallel processing, and in-memory computing. The server 122 and/or servers 142 may include database management systems and may be a HANA® database. The server 122 and/or servers 142 may be systems that are certified by the supplier and authorized to execute the software appliances provided by the supplier.

The software appliance may include database management software and one or more business applications or software intelligence. In one embodiment, the software appliance may include in-memory software (e.g., HANA® appliance software) and one or more business applications that are configured to be stored and operate on the in-memory hardware (e.g., server 122 and/or servers 142). The business applications may include, for example, enterprise resource planning (ERP) software, customer relationship management (CRM) software, and supplier relationship management (SRM) software.

Figure 2:
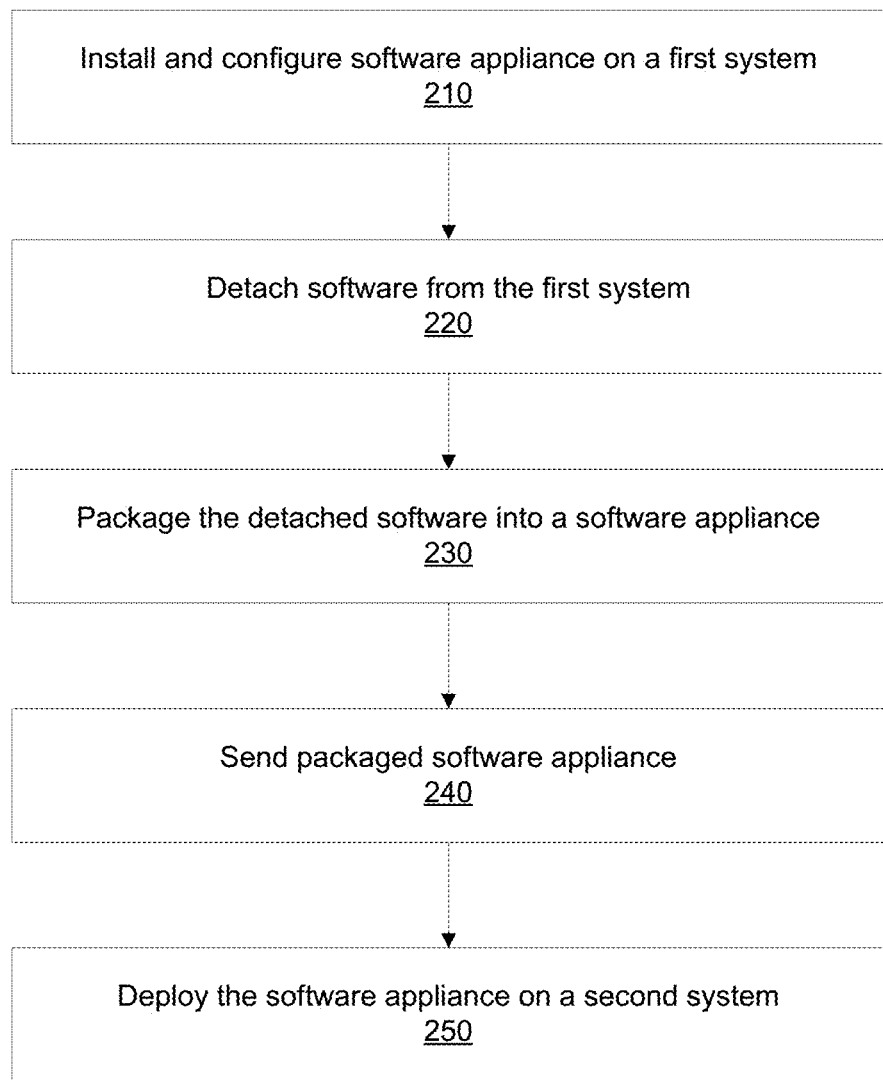
FIG. 2 illustrates a method for providing a software appliance to a system according to an embodiment of the present disclosure.

FIG. 2 illustrates a method 200 for providing a software appliance to a system according to an embodiment of the present disclosure. The method 200 may include installing and configuring a software appliance on a first system (block 210), detaching software from the first system (block 220), packaging the detached software into a software appliance (block 230), sending the packaged software appliance (block 240), and deploying the software appliance on a second system (block 250).

Installing and configuring a software appliance on a first system (block 210) may include a supplier (e.g., supplier 110) installing the software appliance on the first system of the supplier. The installation of the software appliance may be performed in response to a client requesting a specific software appliance to be installed on the second system, which is hardware that is in possession of the client. The client request may include the specific configuration of the hardware on which the software appliance will be installed and the details of the operating system running on the hardware. The supplier may install the software on the first system that is similar to the second system on which the client will install the software.

The installed software appliance may be configured on the first system to ensure proper operation of the software appliance. The software appliance may be configured to a predetermined configuration to perform the operations requested by the client and to be able to operate on the second system. In one embodiment, the software appliance may be configured to a predetermined configuration of the business application and the database software based on the request by the user. The software appliance may be configured with a development tool such as Virtual Appliance Factory. The Virtual Appliance Factory software may provide rapid application development tools to speed up the deployment and configuration time of the applications (e.g., an appliance or system of the NETWEAVER product family sold by SAP AG). The Virtual Appliance Factory software may provide mechanisms such as application templates for a variety of operating systems and operating cases.

In one embodiment, the software appliance may be an in-memory appliance that can be used for business applications and business intelligence allowing real-time responses. The in-memory appliance, which may operate on a HANA® database, may allow for transactional and analytical workloads to be performed fully in-memory. The first and second systems may include components configured to handle one or more of columnar data storage, massively parallel processing, and in-memory computing. The first and second systems may be in-memory servers with special processing units optimized for database processes and column based data access. The software appliance may include a license with restrictions on what kind of system the software appliance can be installed. For example, the license may include that the software appliance may only be used on supplier certified systems.

In another embodiment, the software appliance (e.g., in-memory software appliance) may be a content building block to populate a hosted HANA cloud (e.g., SAP® HANA Enterprise Cloud).

Detaching the software from the first system (block 220) may include separating the software appliance from the first system. Separating the software appliance from the first system may include separating the software appliance from the operating systems and hardware of the first system. The separation of the software from the operating system and the hardware may be performed by a specialized utility tool set.

Figure 3:
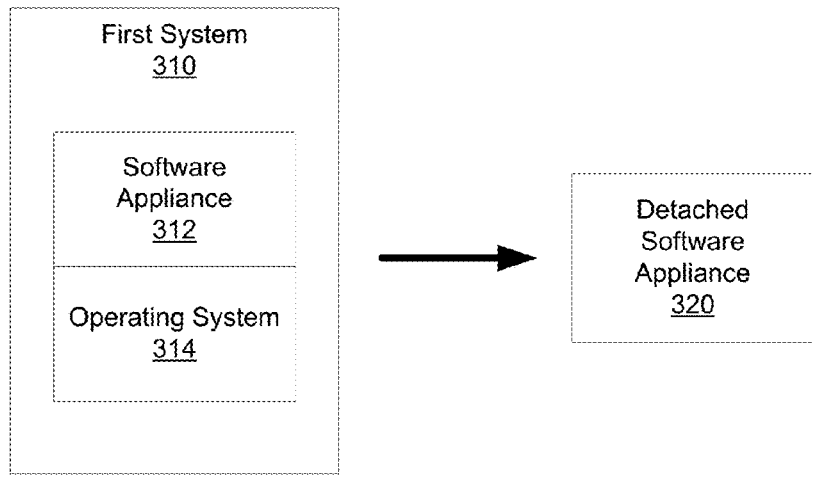
FIG. 3 illustrates a detachment of a software appliance from the first system according to an embodiment of the present disclosure.

FIG. 3 illustrates a detachment of a software appliance from the first system according to an embodiment of the present disclosure. As shown in FIG. 3, the first system 310 may include the installed software appliance 312 and operating system 314. The software appliance 312 may be detached from the operating system 314 and the first system 310. The first computer system 310 may detach the software appliance 312 by unregistering the database and software stack (e.g., the system) in the software appliance 312 from the operating system 314. In some embodiments, the first computer system 310 may write the relevant information of the system and database into the files. The relevant information may include the configurations performed on the software appliance. The information in the files may be used when the software appliance 312 is attached to a second computer system.

In one embodiment, the detachment of the software appliance 312 may include collecting the information (e.g., metadata of the system and database) and detaching the information from the underlying operating system and hardware. The collected information may include the software appliance (e.g., in-memory software and business applications) and the metadata of the software appliance and the first system (e.g., metadata of the operating system, hardware of the first system and database).

The collected information may include information from physical shared directories including global parameters (e.g., profiles) and local parameters (e.g., work, data logs), from locally shared directories and/or from local directories of the system. Thus, the software (e.g., in-memory software) may be separated from the underlying operating system 314 and the hardware of the first computer system 310, while preserving the business content inside the first system 310. The detaching process may preserve any form of business-scenario, business customization, and any configurations in the in-memory system. The information may be collected in an Extensible Markup Language (XML) metadata file.

Packaging the detached software into a software appliance (block 230) may include storing the software appliance and the detached data (e.g., XML metadata file) into a file. The stored files may include the configuration information of the software appliance. In one embodiment, the information stored can include the system identifier, the system number, user information, virtual hostnames, ports, etc. associated with the software appliance. In some embodiments, the registry-keys needed for the database and the system in the software appliance may be exported into files. The user information and the Access Control Lists (ACLs) for the operating system file system layout may also be exported. An ACL can be a list of permissions attached to an object, which may specify which users or system processes are granted access to the object, and what operations are allowed on the object. Each entry in an ACL may specify a subject and an operation.

In one embodiment, packaging the detached software into a software appliance (block 230) may include providing the detached data in a shippable format (e.g., tar or zip archives) which may be included on computer readable medium or sent over a network to the client or to the cloud. The packaged software appliance may include the software appliance and the detached data (e.g., XML metadata file). The software appliance in the packaged software may include the in-memory software and the business applications requested by the client. In one embodiment, the packaged software appliance may include the archives of the software appliance, the detached metadata, and a specialized utility toolset that can reinstall the software appliance on the second system.

Sending the packaged software appliance (block 240) may include providing the packaged software appliance to the client on computer readable medium or sending the packaged software appliance over the network to the client or the cloud. Thus, the client is not required to order bundled hardware and software in order to use the applications of the software appliance. In one embodiment, the packaged software appliance may be provided only to clients who have certified hardware.

Deploying the software appliance on a second system (block 250) may include installing the received packaged software appliance on one or more systems. The specialized utility toolset included as part of the packaged software appliance may reinstall the software appliance on the second system. In one embodiment, the specialized utility toolset may be provided separately from the packaged software appliance.

Figure 4:
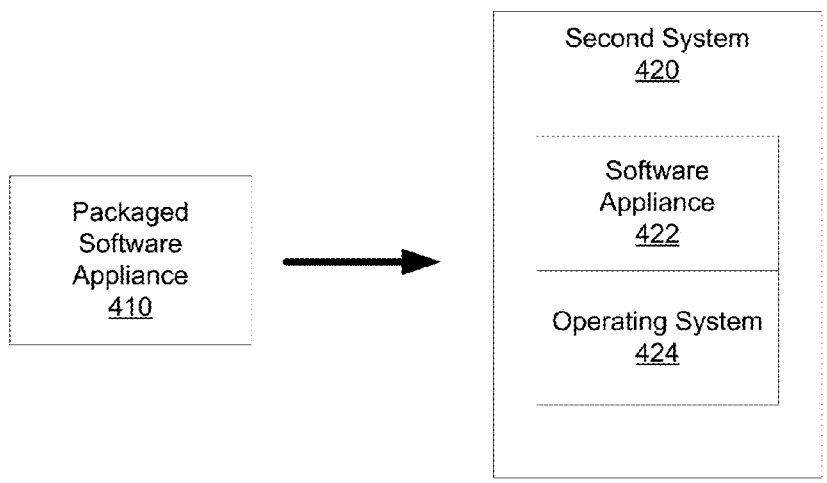
FIG. 4 illustrates the attaching process of a packaged software appliance to the second system according to an embodiment of the present disclosure.

FIG. 4 illustrates the attaching process of a packaged software appliance 410 to the second system 420 according to an embodiment of the present disclosure. Deploying the software appliance on the second system may include attaching the software appliance to the hardware and operating system of the second system 420. In one embodiment, second system 420 may be a server of the client or may be a virtual server in a cloud computer system. After the software appliance 410 is attached to the second system 420, the software appliance 422 may be part of the second system 420. The software appliance 422 attached to the operating system 422 of the second system 420 may preserve the business scenarios, configurations, customizations that were pre-configured during the installation and configuration of the software appliance on the first system (e.g., the first system 310 shown in FIG. 3).

Figure 5:
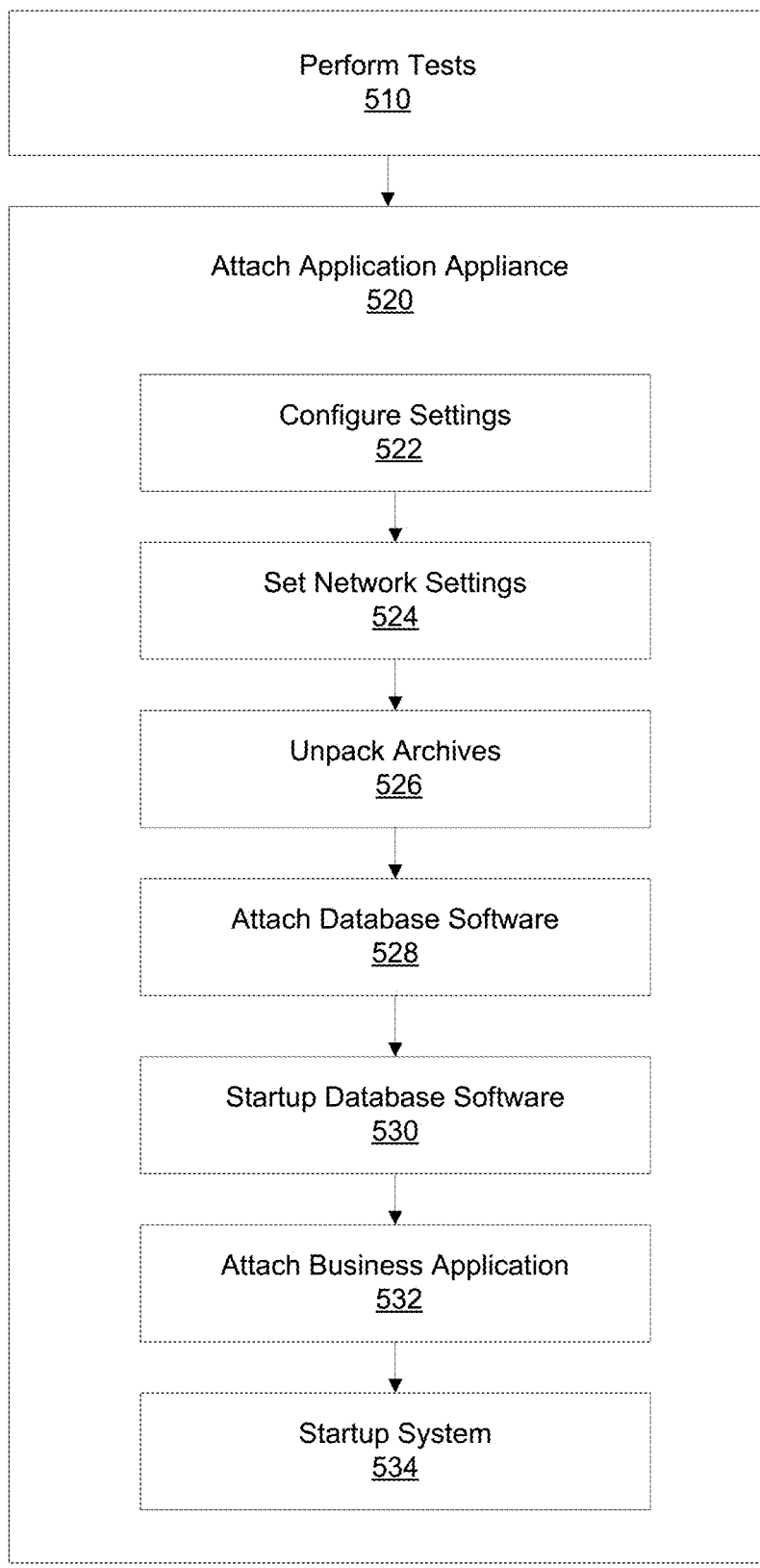
FIG. 5 illustrates a method for attaching the software appliance to a computer system according to an embodiment of the present disclosure.

FIG. 5 illustrates a method 500 for attaching the software appliance to a computer system according to an embodiment of the present disclosure. The method may include performing tests on the system and/or operating system (block 510) and attaching the application appliance to the system (block 520). The testing and the attachment of the application appliance to the system may be performed automatically using the packaged software appliance.

Performing the tests (block 510) may include testing the hardware and the operating system of the system on which the application appliance will be installed to determine whether the packaged software appliance is compatible with the system. The test may be performed before the application appliance is loaded on the system. The software for conducting the checks may be part of the packaged software appliance 410. For example, information in the application appliance (e.g., metadata file) and/or in a separate file from the application appliance may provide test that should be performed.

The test may include determining whether the system is certified hardware. If the hardware of the system is not certified by the application appliance provider or is not certified for the particular type or version of the application appliance, the test may determine that the application appliance cannot be loaded on the system.

In one embodiment, the test may include determining whether the hardware and/or the operating system meet the minimum operating requirements for the software appliance. The test may include determining if the hardware has enough storage (e.g., file system space) and/or memory (e.g., random access memory). The test may also include determining whether the network settings are correct.

The tests may produce results with different severity levels. In one embodiment, if all the checks are passed or if the non-passing checks are only at warning level, the attaching process (block 520) may begin. The software for conducting the checks may be executed on the second system 420. In other embodiment, the first system 310 may perform the test over the network.

In one embodiment, the test may include determining whether the database system (e.g., in-memory hardware) includes a node on which the software appliance may be loaded. In this embodiment, the in-memory hardware may include a plurality of nodes corresponding to processors and memory that can be used for the software appliances. The software appliance may be loaded on one or more of the nodes. Some of the nodes may already have a business application or database management software loaded on the node. The test may determine whether one or more nodes are still available in the database system for the new software appliance. In one embodiment, one node may be needed for the business application (e.g., SAP® system) and one node may be needed for the software appliance (e.g., in-memory software appliance). In this embodiment, the nodes may include one of enterprise resource planning (ERP) software, customer relationship management (CRM) software, and supplier relationship management (SRM) software.

Attaching the software appliance to the system (block 520) may include configuring the settings (block 522), setting network settings (block 524), unpacking archives (block 526), attaching the database software (block 528), starting the database software (block 530), attaching the business application (block 532) and starting the business application (block 534).

Configuring the settings (block 522) may include configuring the operating system, creating user accounts, setting passwords and/or opening ports for connectivity for the system. The settings may be configured to correspond to the settings that were pre-configured on the original system (e.g., first system) by the supplier.

Setting the network settings (block 524) may include activating the virtual hostnames on the system. The network settings may be made based on the test performed on the Domain Name System (DNS) and/or the Dynamic Host Configuration Protocol (DHCP) supported by the system. If the system does not support DNS and DHCP, the network settings may be configured based on the local machine settings or the static IP addressing.

Unpacking the archives (block 526) may include copying the files in the packaged software appliance to the memory of the system. The files may be unpacked from the tar or zip archives and placed in the server file system. The files may be unpacked and placed in the server file system such that they are placed in the same location as they were originally located in the original system (e.g., first system) of the supplier.

Attaching the database software (block 528) (e.g., in-memory database software) may include registering the database software in the software appliance with the operating system of the system (e.g., second system). After the database in the software appliance is registered the database (e.g., in-memory database) may be started (block 530).

The business application may be attached (block 532) after the in-memory database is started. The business application may be started (block 524) after the business application is registered with the operating system of the system. Attaching the database software (block 528) and the business application (block 532) may preserve the configurations, customization, and business processes and scenarios that were preinstalled and configured on the original system (e.g., first system) by the supplier. The software appliance may also preserve rapid deployment solutions, which provide affordable, scalable packages with preconfigured software and implementation services. The client receiving the software appliance does not need to manually re-configure the settings in order for the business application and in-memory database to be started on the system.

Figure 6:
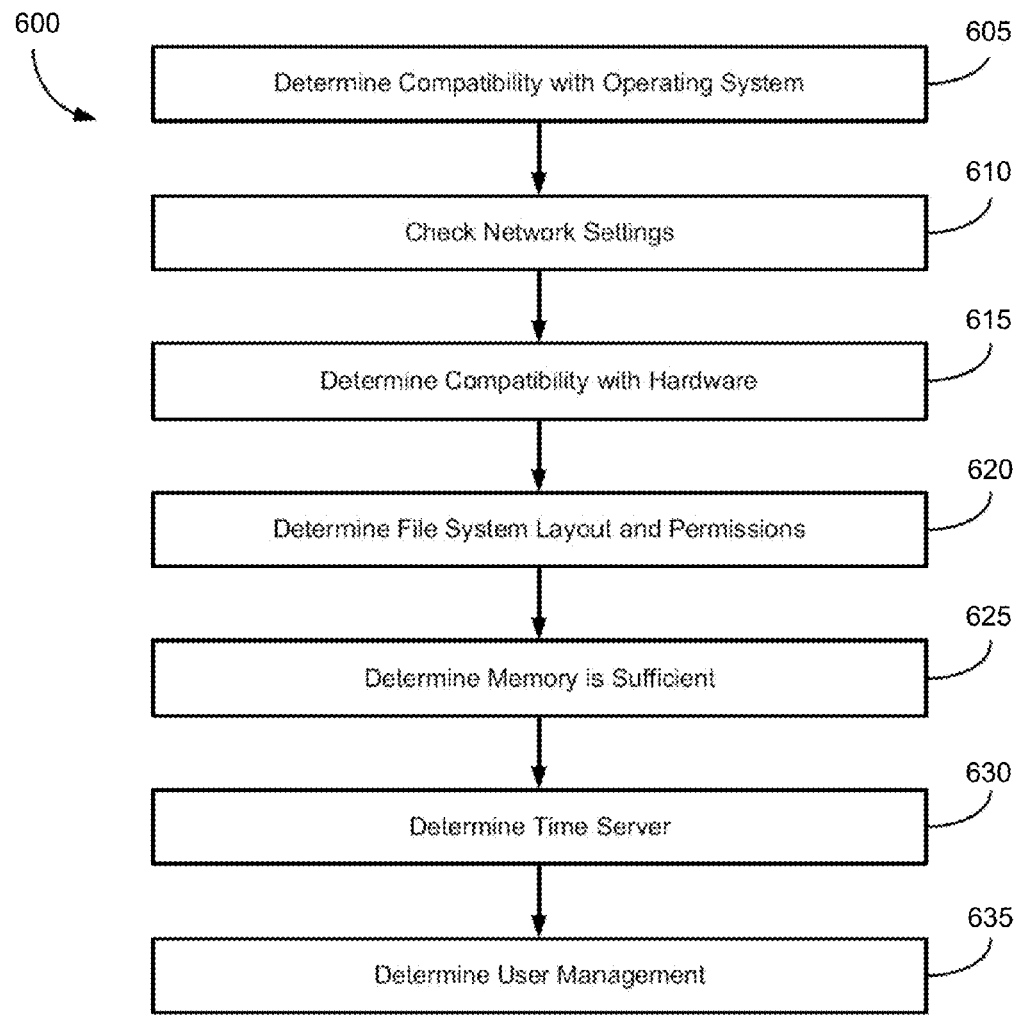
FIG. 6 illustrates a flow diagram depicting a process of determining compatibility between a software appliance and a virtual server.

FIG. 6 illustrates a flow diagram depicting a process 600 of determining compatibility between a software appliance and a virtual server. Process 600 includes determining the software appliance is compatible with an operating system of the virtual server of the cloud computer system (BLOCK 605). For example, the operating system versions, the operating system kernel, the glibc version, and/or the kernel parameters may be checked to ensure that the settings in the software appliance match the settings on the virtual server. The settings in the software appliance may have been stored in the configuration files during the detaching process.

Process 600 includes checking network settings of the virtual server of the cloud computer system (BLOCK 610). For example, the network settings of the virtual server may be checked to see if it supports DNS or DHCP or other protocols. Process 600 also includes determining if the software appliance is compatible with the hardware of the computing device underlying the virtual server of the cloud computer system (BLOCK 615). For example, the disk storage system (e.g., cloud-based virtualized storage space), the network gear (e.g., security firewalls), etc. may be checked to ensure they can support the system and database in the software appliance.

Process 600 includes determining file system layout and permissions of the virtual server of the cloud computer system (BLOCK 620). Different operating systems may have different file system layouts and permissions. For example, some file systems may treat everything in the entire system as a file while other file systems do not. The file system layout and permissions of the virtual server may be checked to make sure they can be used by the system and database in the software appliance. Process 600 further includes determining the virtual server of the cloud computer system has sufficient memory space for the software appliance (BLOCK 625). For example, the size of the RAM, disk space, or swap-space, etc. may be checked to ensure enough space is available to attach and run the software appliance.

Process 600 includes determining the correct time from a server of the cloud computer system (BLOCK 630). In one embodiment, a time server may be a server computer in the cloud computer system that reads the actual time from a reference clock and distributes this information to its clients using a computer network. Process 600 also includes determining correct user-management of the virtual server of the cloud computer system (BLOCK 635). User management can be the process of controlling which users are allowed to access the system. In one embodiment, user management can be performed using Lightweight Directory Access Protocol, Network Information Service, or Local Users.

Figure 7:
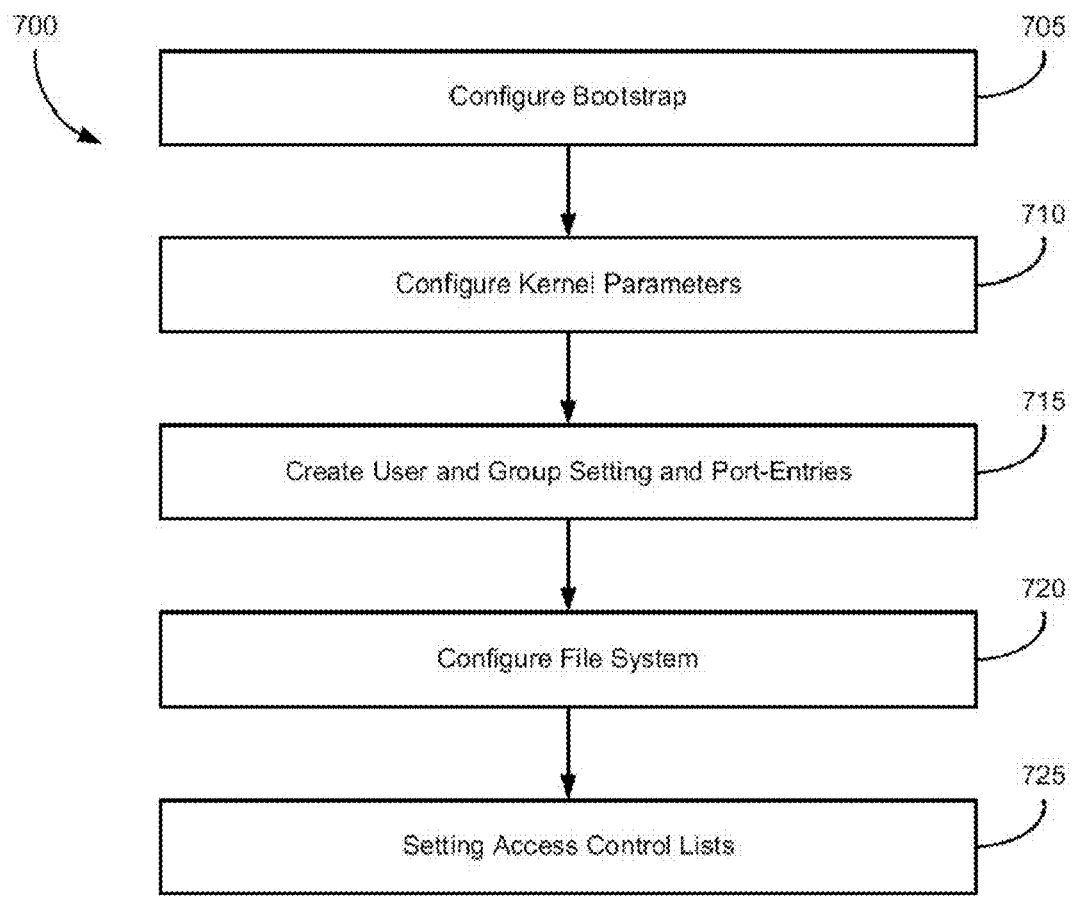
FIG. 7 illustrates a flow diagram depicting a process of configuring a virtual server for a software appliance.

FIG. 7 illustrates a flow diagram depicting a process 700 of configuring a virtual server for a software appliance. Process 700 includes configuring a bootstrap protocol for the software appliance (BLOCK 705). A bootstrap protocol can be an Internet protocol which enables computers to boot themselves over the Internet or local network. For example, by configuring a bootstrap protocol for the system of the software appliance, the system can run on the virtual server after reboot.

Process 700 includes configuring kernel parameters for the software appliance (BLOCK 710). Similar to other configurations, different operating systems have different ways to configure kernel parameters. For example, kernel parameters can be set by modifying a boot loader configuration file. Process 700 includes creating user and group settings and port-entries for the software appliance (BLOCK 715). This can ensure the correct users and groups to gain access to the system. Process 700 also includes configuring file systems for the software appliance (BLOCK 720). In one embodiment, correct access rights on the operating system level for the software appliance can be set. Process 700 further includes setting access control lists for the software appliance (BLOCK 725). The settings can be based on the access control list exported to the files when the software appliance was detached from the operating system (BLOCK 410 in FIG. 4).

Figure 8:
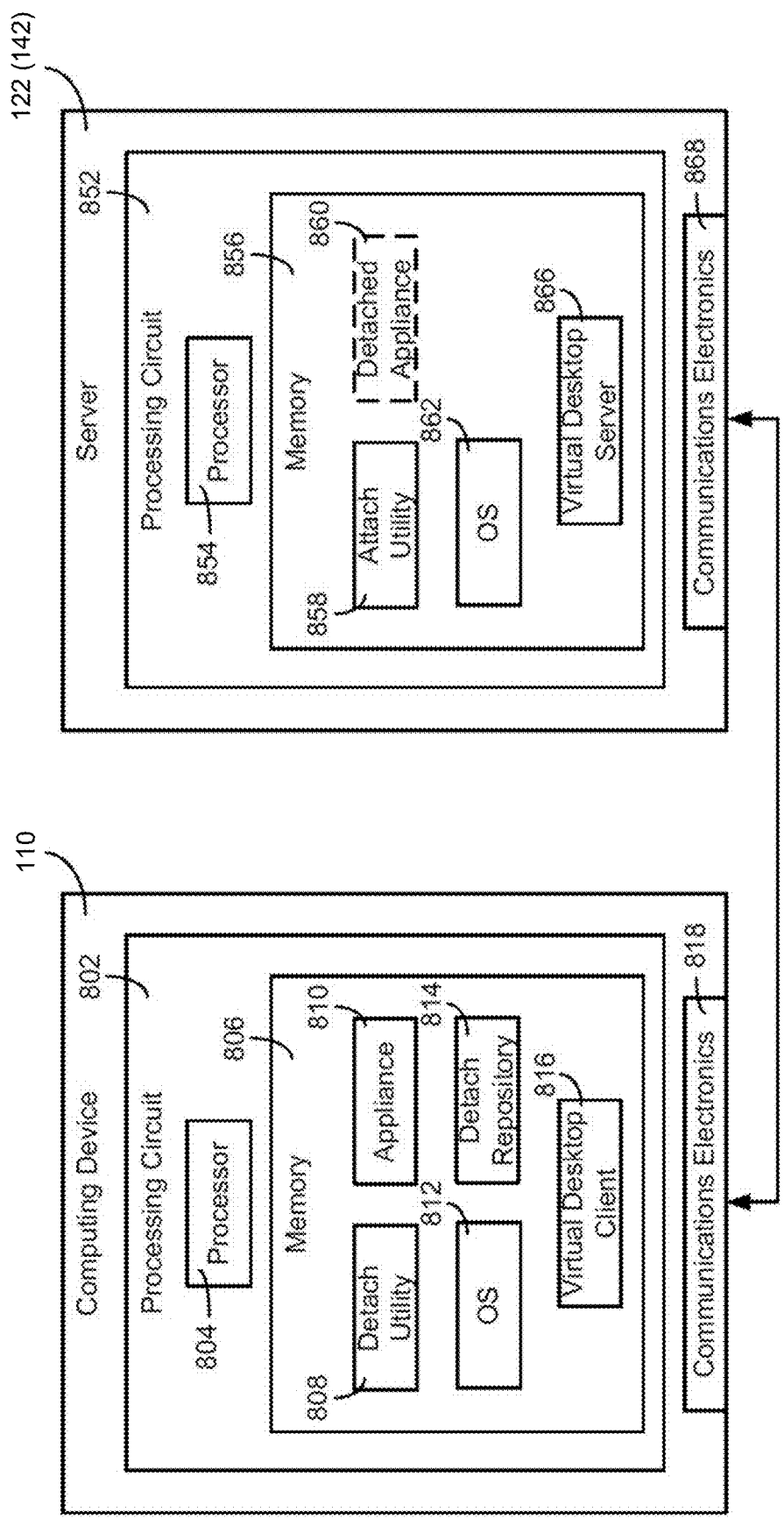
FIG. 8 illustrates a block diagram of computing device and server according to an exemplary embodiment.

Referring now to FIG. 8, a more detailed block diagram of computing device 110 and server 122 or 142 is shown, according to an exemplary embodiment. Computing device 110 and server 122 or 142 are each shown to include a processing circuit 802, 852, respectively. Each processing circuit 802, 952 respectively includes a processor 804, 854 and memory 806, 856. Processor 804, 854 may be implemented as a general purpose processor, an application specific integrated circuit (ASIC), one or more field programmable gate arrays (FPGAs), a CPU, a GPU, a group of processing components, or other suitable electronic processing components. Each memory 806, 856 may be or include one or more devices (e.g., RAM, ROM, Flash memory, hard disk storage, etc.) for storing data and/or computer code for completing and/or facilitating the various processes, layers, and modules described in the present disclosure. Memory 806, 856 may include volatile memory or non-volatile memory. Memory 806, 856 may include database components, object code components, script components, or any other type of information structure for supporting the various activities and information structures described in the present disclosure. Memory 806, 856 may be communicably connected to processor 804, 854 via processing circuit 802, 852 and includes computer code (e.g., via the modules stored in memory) for executing one or more processes described herein. Memory 806, 856 may be non-transient computer-readable media configured to store computer code modules for execution by the processor and/or other components of the processing circuit. Particularly, memory 806, 856 may include a module or modules for appropriately completing each step of the processes described herein.

In the exemplary embodiment shown in FIG. 8, memory 806 of computing device 110 is shown to include a detach utility 808, an appliance 810 (e.g., a software appliance 312 as described in FIG. 3), an operating system (OS) 812, detach repository 814, and virtual desktop client 816. In the exemplary embodiment shown in FIG. 8, memory 856 of server 122 or 142 is shown to include an attach utility 858, appliance 860 (e.g., a software appliance 422 as described in FIG. 4), an OS 862, a detach repository 864, and virtual desktop server 866.

Computing device 110 includes communications electronics 818 and server 122 or 142 includes communications electronics 868. Communications electronics 818, 868 may include wired or wireless interfaces (e.g., jacks, antennas, transmitters, receivers, transceivers, wire terminals, Ethernet ports, WiFi transceivers, etc.) for conducting data communications between computing device 105 and server 120, and between computing device 110 and server 122 or 142 and other local or remote devices or systems of the system.

Referring still to FIG. 8, detach utility 808 may be configured to generate user interfaces for allowing a user to control or execute a detach process. In an exemplary embodiment, such user interfaces can include options for configuring a network adapter, options for configuring a network subnet, options for installing an adaptive computing controller (ACC) agent, options for otherwise configuring the network, and/or options for configuring a bootstrap. The user interfaces can include options for preparing the detachment, detaching users, and/or detaching file system access control lists (ACLs). The user interfaces can also or alternatively include options for detaching a database and/or detaching a database environment. The user interfaces can also or alternatively include options for detaching the appliance and/or detaching the appliance environment. In an exemplary embodiment, the user interfaces can further include options for reattaching the database and/or appliance. In an exemplary embodiment, the user interface can also include options for archiving the database data, user data, or other data used by the appliance on the first system. The processes for detaching may deregister the database and deregister the appliance from the first system.

All relevant information of the database and/or appliance may be written into a file or files as a result of the detachment processes. Registry keys and other system settings necessary for proper operation may also be written to files which memorialize such settings for later application upon attachment. The detachment processes may also export user information and ACLs for the OS file system layout. The detach utility 808 can store all of the files that result during the detachment as the appliance 810 and/or in a detach repository 814. The system can send the appliance 810, the detach repository 814, and/or an attachment utility to the second device (e.g., server 120) via the communication electronics of both devices. These files may be transmitted to and stored in memory of the server 122 or 142 as detached appliance 860.

Referring still to FIG. 8, attach utility 808 may be configured to generate user interfaces for allowing a user to control or execute an attachment process as described herein. In an exemplary embodiment, such user interfaces can include options for configuring a network adapter, options for configuring a network subnet, options for installing an ACC agent, options for otherwise configuring the network, or options for configuring the bootstrap. The user interfaces of the attach utility can further include options for installing an appliance management control (MMC), options for creating users and groups, options for initializing user profiles, options for setting ACL for file systems, options for creating network shares, and options for creating service entries. The user interfaces can further include options for preparing a new database, options for attaching a new database (e.g., the database received from the computing device 110), and/or options for starting the new database. The user interfaces can yet further include options for attaching the appliance, options for processing relative to the appliance, and options for starting the appliance. The attach utility 858, during an exemplary attach process, may install a host agent, activate virtual hostnames for the appliance and database, install an MMC, create users and groups as necessary, create port or firewall entries, set ACLs for the appliance and database on the OS file system, register the database, register the appliance, and start the database and the appliance.

The above-described systems and methods can be implemented in digital electronic circuitry, in computer hardware, firmware, and/or software embodied on a tangible medium. The implementation can be as a computer program product (i.e., a computer program tangibly embodied in an information carrier). The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site. Method steps can be performed by one or more programmable processors executing a computer program to perform functions of the disclosure by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CDROM, and/or DVD-ROM disks. The processor and the memory can be supplemented by, and/or incorporated in special purpose logic circuitry.

To provide for interaction with a user, the above-described techniques can be implemented on a computer having a display device. The display device can, for example, be a cathode ray tube (CRT) and/or a liquid crystal display (LCD) monitor. The interaction with a user can, for example, be a display of information to the user via a keyboard or a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above-described techniques can be implemented in a distributed computing system that includes a back-end component. The back-end component can, for example, be a data server, a middleware component, and/or an application server. The above-described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, Hiper-LAN), and/or other packet-based networks. Circuit-based networks can include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

The client device can include, for example, a computer, a computer with a browser device, a telephone, an IP phone, a mobile device (e.g., cellular phone, smart phone, personal digital assistant (PDA) device, laptop computer, electronic mail device), and/or other communication devices. The browser device includes, for example, a computer (e.g., desktop computer, laptop computer) with a World Wide Web browser (e.g., Microsoft® Internet Explorer® available from Microsoft Corporation, Mozilla® Firefox available from Mozilla Corporation). The mobile computing device includes, for example, a personal digital assistant (PDA).

Comprise, include, and/or plural forms of each are open ended and include the listed parts and can include additional parts that are not listed. And/or is open ended and includes one or more of the listed parts and combinations of the listed parts.

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various non-transitory computer readable storage media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Moreover, various functions described herein can be implemented in hardware, software, firmware, or any combination thereof. If implemented in software, the functions can be stored on or transmitted over as one or more instructions or code on a non-transitory computer-readable storage medium. Non-transitory computer-readable storage media can be non-transitory in nature and can include both computer storage media and communication media including any medium that facilitates transfer of a computer program from one place to another. A storage media can be any available media that can be accessed by a computer. By way of example, and not limitation, such non-transitory computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any physical connection is properly termed a non-transitory computer-readable storage medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc (BD), where disks usually reproduce data magnetically and discs reproduce data optically with lasers. Combinations of the above should also be included within the scope of non-transitory computer-readable storage media.

Additionally, in the subject description, the word "exemplary" is used to mean serving as an example, instance, or illustration. Any embodiment or design described herein as "exemplary" is not necessarily to be construed as preferred or advantageous over other embodiments or designs. Rather, use of the word exemplary is intended to present concepts in a concrete manner.

One skilled in the art will realize the disclosure may be embodied in other specific forms without departing from the spirit or essential characteristics thereof. The foregoing embodiments are therefore to be considered in all respects illustrative rather than limiting of the disclosure described herein. Scope of the disclosure is thus indicated by the appended claims, rather than by the foregoing description, and all changes that come within the meaning and range of equivalency of the claims are therefore intended to be embraced therein.

Although the processes illustrated and described herein include series of steps, it will be appreciated that the different embodiments of the present disclosure are not limited by the illustrated ordering of steps, as some steps may occur in different orders, some concurrently with other steps apart from that shown and described herein. In addition, not all illustrated steps may be required to implement a methodology in accordance with the present disclosure. Moreover, it will be appreciated that the processes may be implemented in association with the apparatus and systems illustrated and described herein as well as in association with other systems not illustrated.

The above descriptions and illustrations of embodiments of the disclosure, including what is described in the Abstract, is not intended to be exhaustive or to limit the embodiments to the precise forms disclosed. While specific embodiments of, and examples for, the embodiments are described herein for illustrative purposes, various equivalent modifications are possible within the scope of the disclosure, as those skilled in the relevant art will recognize. These modifications can be made to the embodiments in light of the above detailed description.

We claim:

1. A computer implemented method comprising:
    installing a software appliance on a first computer system, the software appliance including database software and a business application;
    configuring the software appliance on the first computer system to a predetermined configuration of the business application and the database software;
    detaching the software appliance from an operating system of the first computing device, wherein the detaching includes collecting metadata associated with the software appliance, the operating system and hardware of the first system and detaching the collected metadata from the operating system and the hardware of the first system while preserving content utilized by the business application, the collected metadata providing a test to be performed; and storing the detached software appliance and the collected metadata on computer readable medium to enable the detached software application to be deployed on a different computer system and to allow the different computer system to run the test provided by the collected metadata;

wherein:

the database software is in-memory database software and includes a utility tool set, the business application uses the in-memory database software and the utility tool set to perform the business application operations the test is selected from a group consisting of: determining whether the software appliance is compatible with the different computer system, determining whether the different computer system comprises certified hardware, determining whether the hardware and/or operating system of the different computer system meet minimum operating requirements for the software appliance, determining whether hardware of the different computer system has sufficient storage, and determining whether network settings for the different computer system are correct, the software appliance is not deployed on the different computer system if the test fails.

2. The method of claim 1, wherein the business application is one of an enterprise resource planning (ERP) software, a customer relationship management (CRM) software, and a supplier relationship management (SRM) software.

3. The method of claim 1, wherein the predetermined configuration is based on a request from a user requesting the software appliance to be installed on a second computer system.

4. The method of claim 3, wherein the predetermined configuration includes specifications of hardware on the second computer system.

5. The method of claim 4, wherein the predetermined configuration includes specifications of an operating system on the second computer system.

6. The method of claim 3, wherein the first computer system and the second computer system include the same hardware and operating systems.

7. The method of claim 1, wherein the first computer system includes an in-memory database.

8. The method of claim 1, further comprising:

determining if the software appliance is compatible with hardware and operating system of a second computer system; and if it is determined that the software appliance is compatible with the second computer system, attaching the software appliance to an operating system of a second computer system.

9. The method of claim 8, wherein determining if the software appliance is compatible with the hardware and the operating system of the second computer system includes:

determining if the hardware of the second computer system is certified by a supplier of the software appliance;

determining if the hardware includes sufficient memory space for the software appliance; and checking network setting of the second computer system.

10. The method of claim 8, wherein attaching the software appliance to the operating system of the second computer system includes:

registering the database software with the operating system of the second computer system;

starting the database software on the second computer system;

registering the business application with the operating system of the second computer system; and starting the business application on the second computer system.

11. The method of claim 1, further comprising:

configuring bootstrap for the software appliance; configuring kernel parameters for the software appliance;

creating user and group settings for the software appliance;

configuring a file system for the software appliance; and setting access control lists for the software appliance.

12. A non-transitory computer readable medium containing program instructions, wherein execution of the program instructions by one or more processors of a computer system causes one or more processors to perform operations comprising:

installing a software appliance on a first computer system, the software appliance including database software and a business application;

configuring the software appliance on the first computer system to a predetermined configuration of the business application and the database software;

detaching the software appliance from an operating system of the first computing device, wherein the detaching includes collecting metadata associated with the software appliance, the operating system and hardware of the first system and detaching the collected metadata from the operating system and the hardware of the first system while preserving content utilized by the business application, the collected metadata providing a test to be performed; and storing the detached software appliance and the collected metadata on computer readable medium to enable the detached software application to be deployed on a different computer system and to allow the different computer system to run the test provided by the collected metadata;

wherein:

the database software is in-memory database software and includes a utility tool set, the business application uses the in-memory database software and the utility tool set to perform the business application operations the test is selected from a group consisting of: determining whether the software appliance is compatible with the different computer system, determining whether the different computer system comprises certified hardware, determining whether the hardware and/or operating system of the different computer system meet minimum operating requirements for the software appliance, determining whether hardware of the different computer system has sufficient storage, and determining whether network settings for the different computer system are correct, the software appliance is not deployed on the different computer system if the test fails.

13. The non-transitory computer readable medium of claim 12, wherein the business application is one of an enterprise resource planning (ERP) software, a customer relationship management (CRM) software, and a supplier relationship management (SRM) software.

14. The non-transitory computer readable medium of claim 12, wherein the predetermined configuration is based on a request from a user requesting the software appliance to be installed on a second computer system.

15. The non-transitory computer readable medium of claim 14, wherein the predetermined configuration includes specifications of hardware on the second computer system and specifications of an operating system on the second computer system.

16. A computer implemented method comprising:
installing a software appliance on a first computer system, the software appliance including an in-memory database software, a business application using the in-memory database software, and a utility tool set to deploy the software appliance on a second computer system, the business application being one of an enterprise resource planning (ERP) software, a customer relationship management (CRM) software, and a supplier relationship management (SRM) software; configuring the software appliance on the first computer system to a predetermined configuration of the business application and the in-memory database software, the predetermined configuration being determined based on a request from a user requesting the software appliance to be installed on the second computer system and the request including the specification of hardware of the second computer system and specification of an operating system on the second computer system;
detaching the software appliance from an operating system of the first computing device, wherein the detaching includes collecting metadata associated with the software appliance, the operating system and hardware of the first system and detaching the collected metadata from the operating system and the hardware of the first system while preserving content utilized by the business application;
determining if the software appliance is compatible with the hardware and the operating system of a second computer system; and
if it is determined that the software appliance is compatible with the second computer system, using the utility tool set to attach the software appliance to the operating system of the second computer system,
wherein attaching the software appliance to the operating system of the second computer system includes:
registering the in-memory database software with the operating system of the second computer system,
starting the in-memory database software on the second computer system,
registering the business application with the operating system of the second computer system,
starting the business application on the second computer system, and
running a test specified by the collected metadata, the test being selected from a group consisting of: determining whether the software appliance is compatible with the different computer system, determining whether the different computer system comprises certified hardware, determining whether the hardware and/or operating system of the different computer system meet minimum operating requirements for the software appliance, determining whether hardware of the different computer system has sufficient storage, and determining whether network settings for the different computer system are correct.

* * * * *